US012585116B2

(12) United States Patent
Otsuka

(10) Patent No.: US 12,585,116 B2
(45) Date of Patent: Mar. 24, 2026

(54) LIGHT-SHIELDING MEMBER AND HEAD-MOUNTED DISPLAY

(71) Applicant: Sony Interactive Entertainment Inc., Tokyo (JP)

(72) Inventor: Yoshiyuki Otsuka, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 456 days.

(21) Appl. No.: 18/001,088

(22) PCT Filed: Jun. 11, 2021

(86) PCT No.: PCT/JP2021/022355
§ 371 (c)(1),
(2) Date: Dec. 8, 2022

(87) PCT Pub. No.: WO2021/256402
PCT Pub. Date: Dec. 23, 2021

(65) Prior Publication Data
US 2023/0213768 A1　　Jul. 6, 2023

(30) Foreign Application Priority Data

Jun. 17, 2020　(JP) ................................. 2020-104858

(51) Int. Cl.
*G02B 27/00*　　(2006.01)
*G02B 27/01*　　(2006.01)

(52) U.S. Cl.
CPC ..... *G02B 27/0172* (2013.01); *G02B 27/0176* (2013.01); *G02B 2027/0154* (2013.01)

(58) Field of Classification Search
CPC ............ G02B 27/0172; G02B 27/0176; G02B 2027/0154; G02B 7/22; G02B 27/01;
(Continued)

(56) References Cited

U.S. PATENT DOCUMENTS

| 10,251,292 B2 | 4/2019 | Araki | |
| 2017/0307787 A1* | 10/2017 | Kawamura | ........ G02B 27/0172 |

(Continued)

FOREIGN PATENT DOCUMENTS

| CN | 203773162 U | 8/2014 |
| CN | 104739576 A | 7/2015 |

(Continued)

OTHER PUBLICATIONS

Notification of Reasons for Refusal for corresponding CN Application No. 202180031001.0, 19 pages, dated Dec. 16, 2024.
(Continued)

*Primary Examiner* — Henry Duong
(74) *Attorney, Agent, or Firm* — Kilpatrick Townsend & Stockton LLP

(57) ABSTRACT
A light-shielding member that moderates the contact pressure is provided. The light-shielding member reduces external light to be incident to the eyes of a user who is wearing a head-mounted display and includes an attachment portion that is attached to a housing of the head-mounted display and a light-shielding wall extending backwardly from the attachment portion. The light-shielding wall includes at least at part thereof bellows that come into contact with the periphery of the eyes of the user who is wearing the head-mounted display and are deformed to expand and contract in response to the contact pressure.

16 Claims, 8 Drawing Sheets

(58) Field of Classification Search
CPC ............ G02B 27/0101; G02B 27/0149; G02B 27/0103; G02B 27/017; G02B 27/0179; G02B 27/0189; G02B 2027/0105; G02B 2027/0107; G02B 2027/0109; G02B 2027/011; G02B 2027/0112; G02B 2027/0114; G02B 2027/0116; G02B 2027/0118; G02B 2027/012; G02B 2027/0121; G02B 2027/0123; G02B 2027/0125; G02B 2027/0127; G02B 2027/0129; G02B 2027/013; G02B 2027/0132; G02B 2027/0134; G02B 2027/0136; G02B 2027/0138; G02B 2027/014; G02B 2027/0141; G02B 2027/0143; G02B 2027/0145; G02B 2027/0147; G02B 2027/015; G02B 2027/0152; G02B 2027/0156; G02B 2027/0158; G02B 2027/0159; G02B 2027/0161; G02B 2027/0163; G02B 2027/0165; G02B 2027/0167; G02B 2027/0169; G02B 2027/0178; G02B 2027/0174; G02B 2027/0181; G02B 2027/0185; G02B 2027/0183; G02B 2027/0187; G02B 2027/019; G02B 2027/0192; G02B 2027/0194; G02B 2027/0196; G02B 2027/0198
USPC ........................................................ 359/630
See application file for complete search history.

(56) References Cited

U.S. PATENT DOCUMENTS

| | | | |
|---|---|---|---|
| 2017/0318281 A1 | 11/2017 | Edlund | |
| 2018/0027676 A1 | 1/2018 | Araki | |
| 2018/0239151 A1 | 8/2018 | Chang | |

FOREIGN PATENT DOCUMENTS

| | | | | |
|---|---|---|---|---|
| CN | 104880823 A | * | 9/2015 | ........... G02B 27/017 |
| CN | 105607261 A | | 5/2016 | |
| CN | 208384229 U | | 1/2019 | |
| JP | 07301762 A | | 11/1995 | |
| JP | 8140014 A | | 5/1996 | |
| JP | 2017195515 A | | 10/2017 | |
| JP | 2019537287 A | | 12/2019 | |
| WO | 2016136657 A1 | | 9/2016 | |

OTHER PUBLICATIONS

Notice of Reasons for Refusal for corresponding JP Application No. 2022-531774, 8 pages, Jan. 28, 2025.
Extended European Search Report for corresponding EP Application No. 21825899.4, 7 pages, Jun. 17, 2024.
International Search Report for corresponding PCT Application No. PCT/JP2021/022355, 4 pages, Aug. 31, 2021.

* cited by examiner

F I G . 3
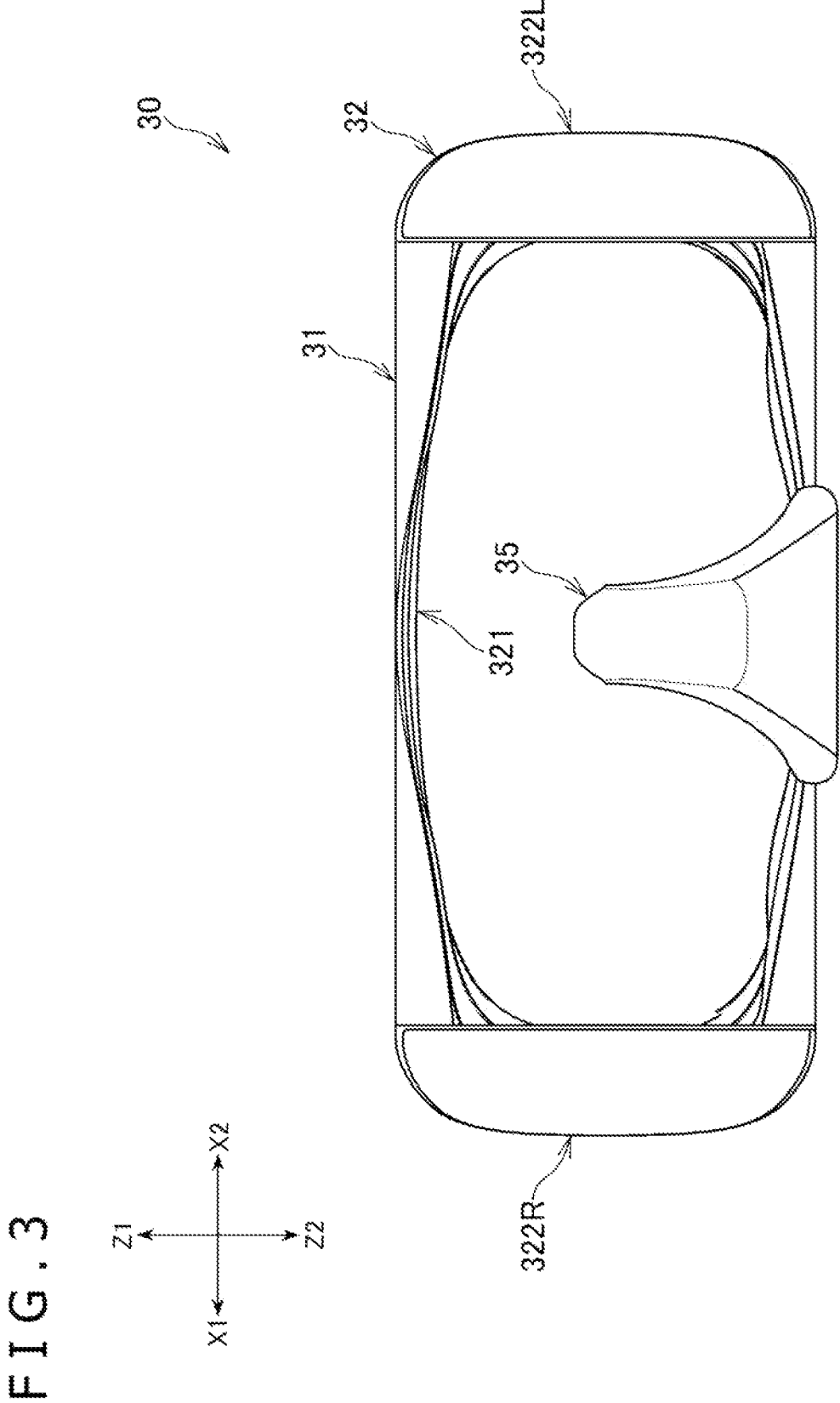

F I G . 4
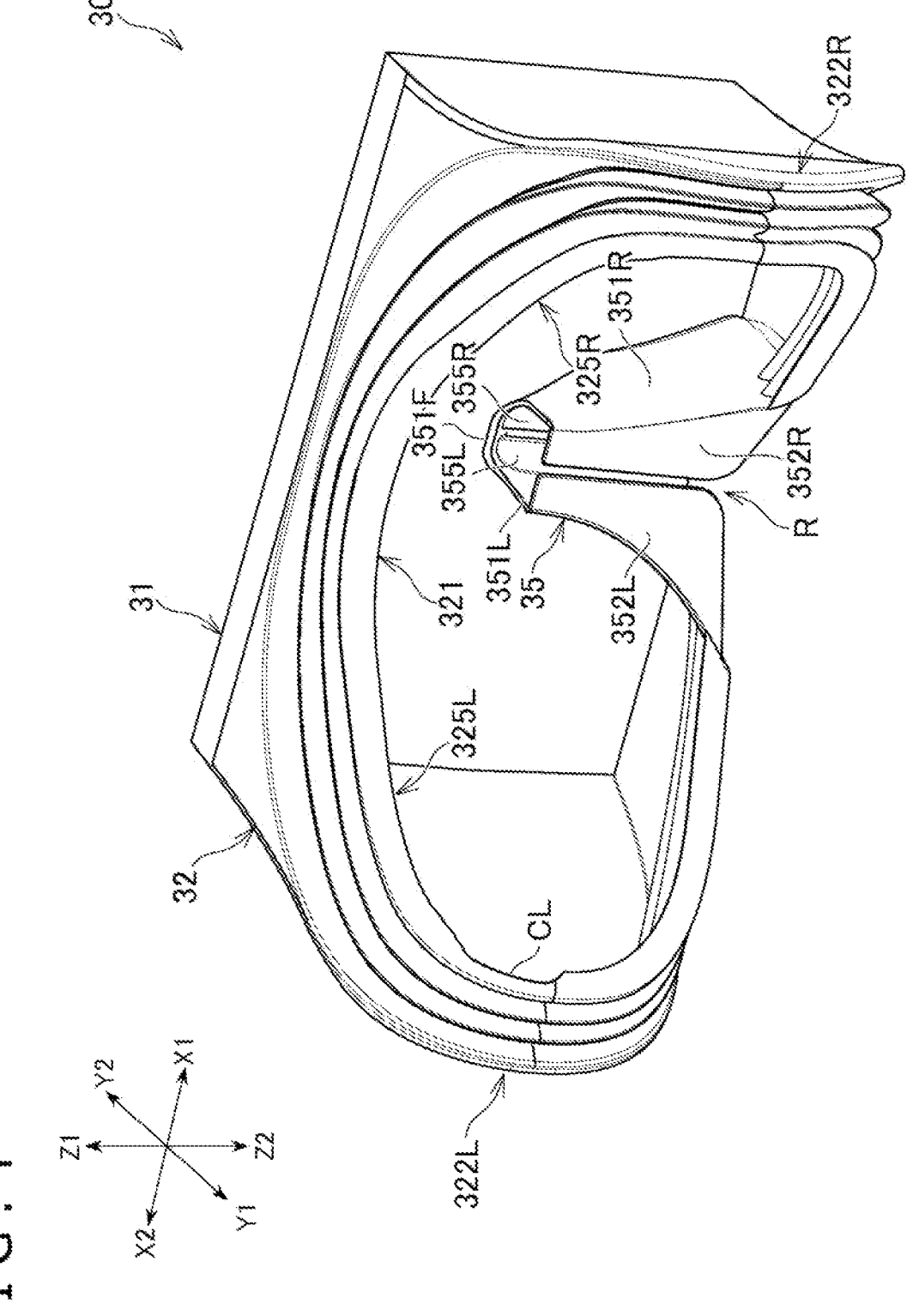

F I G . 5
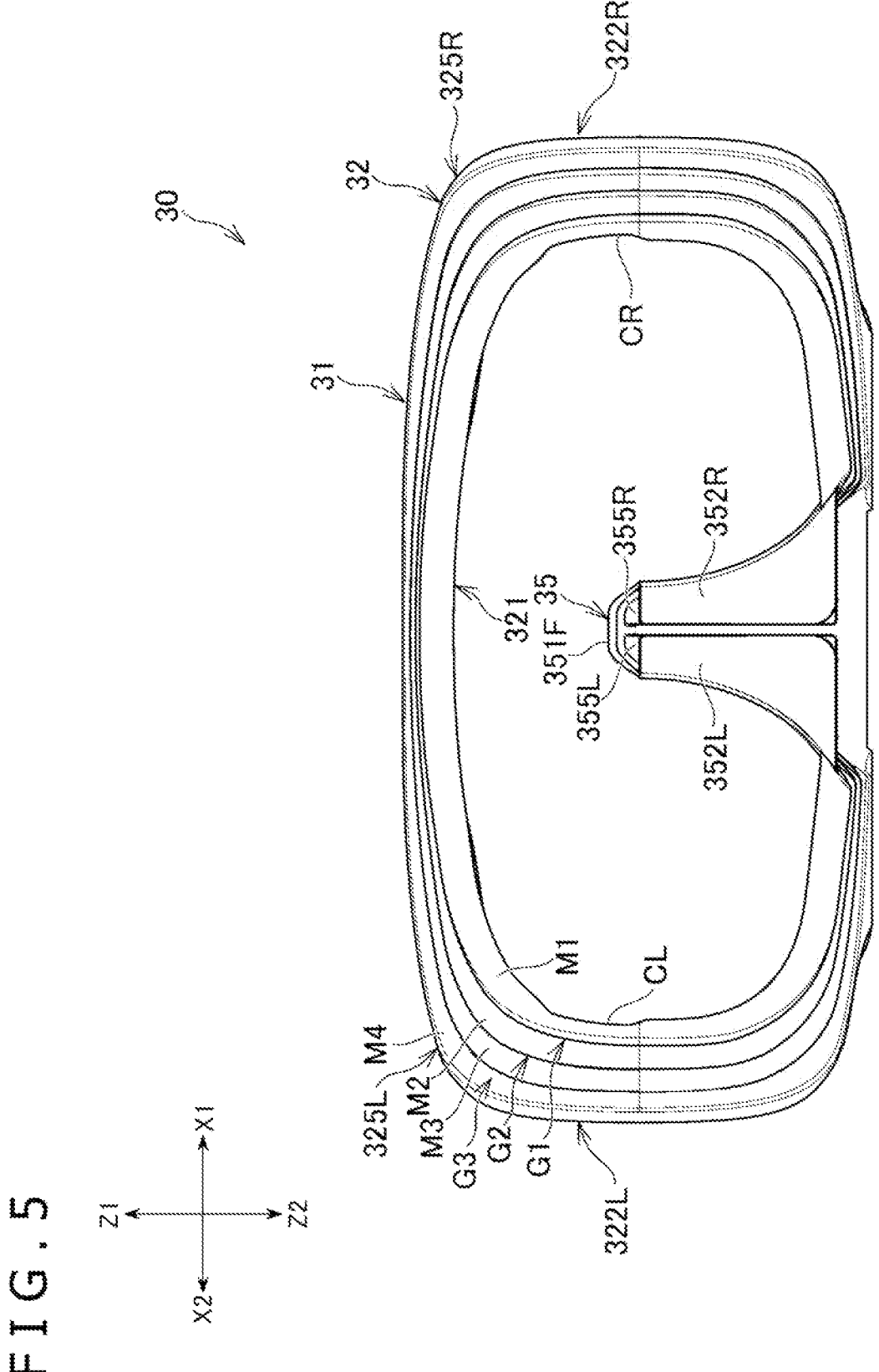

F I G . 8
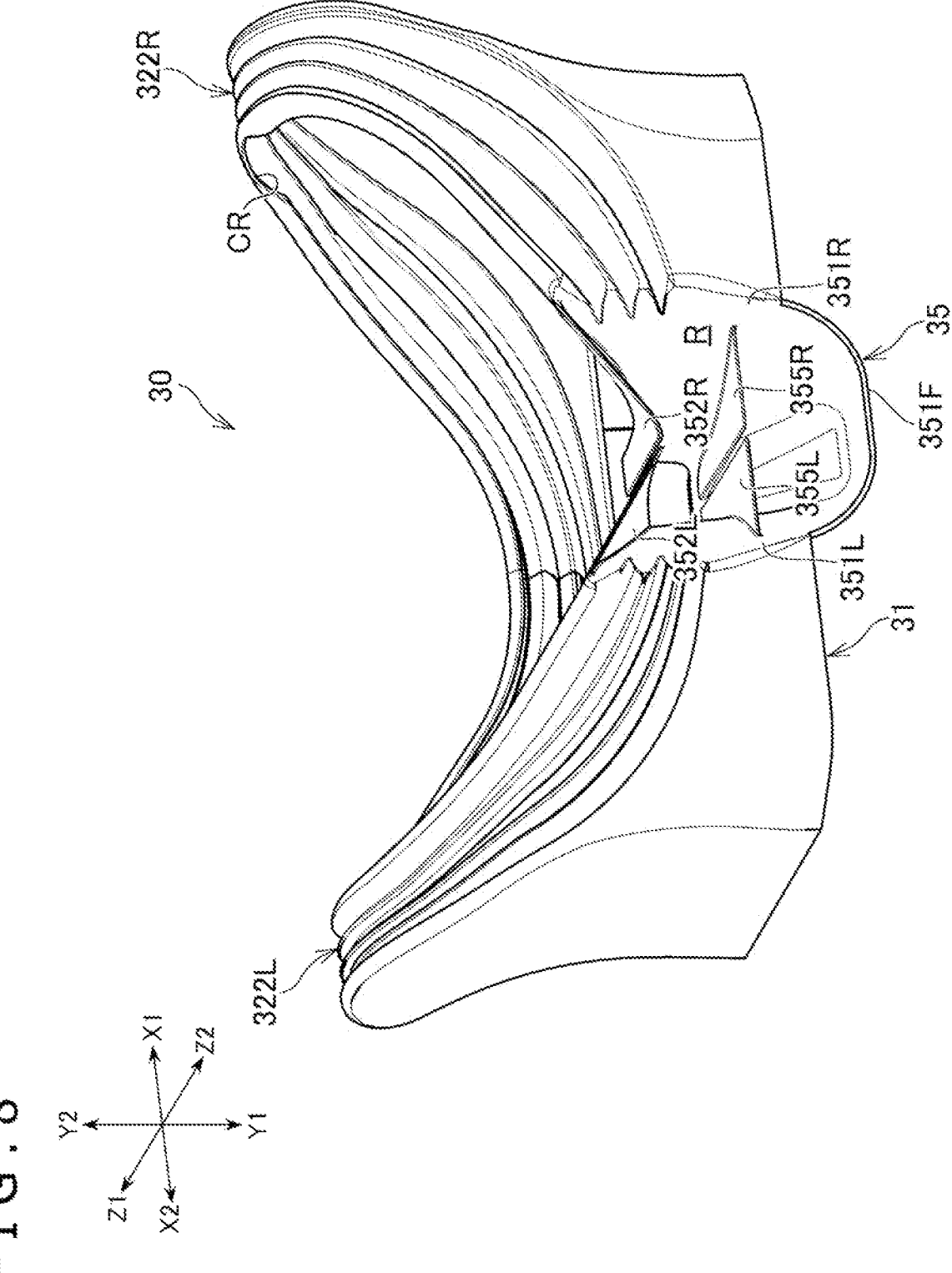

LIGHT-SHIELDING MEMBER AND HEAD-MOUNTED DISPLAY

TECHNICAL FIELD

The present invention relates to a light-shielding member and a head-mounted display.

BACKGROUND ART

Among head-mounted displays, there is known a head-mounted display which includes a light-shielding member (sometimes called a light shield) that reduces external light to be incident to the eyes of a user as disclosed, for example, in PTL 1.

CITATION LIST

Patent Literature

[PTL 1] PCT Patent Publication No. WO2016/136657

SUMMARY

Technical Problem

It is preferable that there be no gap between a light-shielding member and the user's face and that the light-shielding member do not provide an uncomfortable feeling to the user with its contact pressure to the face. The shape and the size of the face of a person are various depending upon the age, sex, race, and so forth, and a light-shielding member that is suitable for the faces of various shapes and sizes is demanded.

The present invention has been made in view of the problem described above, and one of objects of the present invention resides in provision of a light-shielding member and a head-mounted display by which the contact pressure is moderated.

Solution to Problem

An example of the light-shielding member proposed by the present disclosure is a light-shielding member that reduces external light to be incident to eyes of a user who is wearing a head-mounted display and includes an attachment portion that is attached to a housing of the head-mounted display, and a light-shielding wall extending backwardly from the attachment portion. The light-shielding wall includes at least at part thereof bellows that come into contact with a periphery of the eyes of the user who is wearing the head-mounted display and are deformed to expand and contract in response to a contact pressure.

An example of the head-mounted display proposed by the present disclosure is a head-mounted display including a housing, a mounting band that extends backwardly from the housing and is to be mounted on a head of a user, and a light-shielding member that reduces external light to be incident to eyes of the user. The light-shielding member includes an attachment portion that is attached to the housing, and a light-shielding wall extending backwardly from the attachment portion, and the light-shielding wall includes at least at part thereof bellows that come into contact with a periphery of the eyes of the user who is wearing the head-mounted display and are deformed to expand and contract in response to a contact pressure.

BRIEF DESCRIPTION OF DRAWINGS

FIG. 3 is a front elevational view of the light-shielding member of the present embodiment as viewed from the front.

FIG. 4 is a perspective view of the light-shielding member of the present embodiment as viewed from the back diagonally.

FIG. 5 is a rear elevational view of the light-shielding member of the present embodiment as viewed from the back.

FIG. 8 is a perspective view of the light-shielding member of the present embodiment as viewed from below diagonally.

DESCRIPTION OF EMBODIMENT

In the following, an embodiment of the present invention (hereinafter referred to as the present embodiment) is described with reference to the drawings. In the following description, directions indicated by X1 and X2 in the figures represent rightward and leftward directions, respectively, directions indicated by Y1 and Y2 in the figures represent forward and backward directions, respectively, and directions indicated by Z1 and Z2 in the figures represent upward and downward directions, respectively. The directions mentioned indicate directions as viewed from a user who is wearing a head-mounted display 1. Further, in the description given below, the head-mounted display 1 is referred to as an HMD 1.

[Overview of General Configuration of HMD 1]

Figure 1:
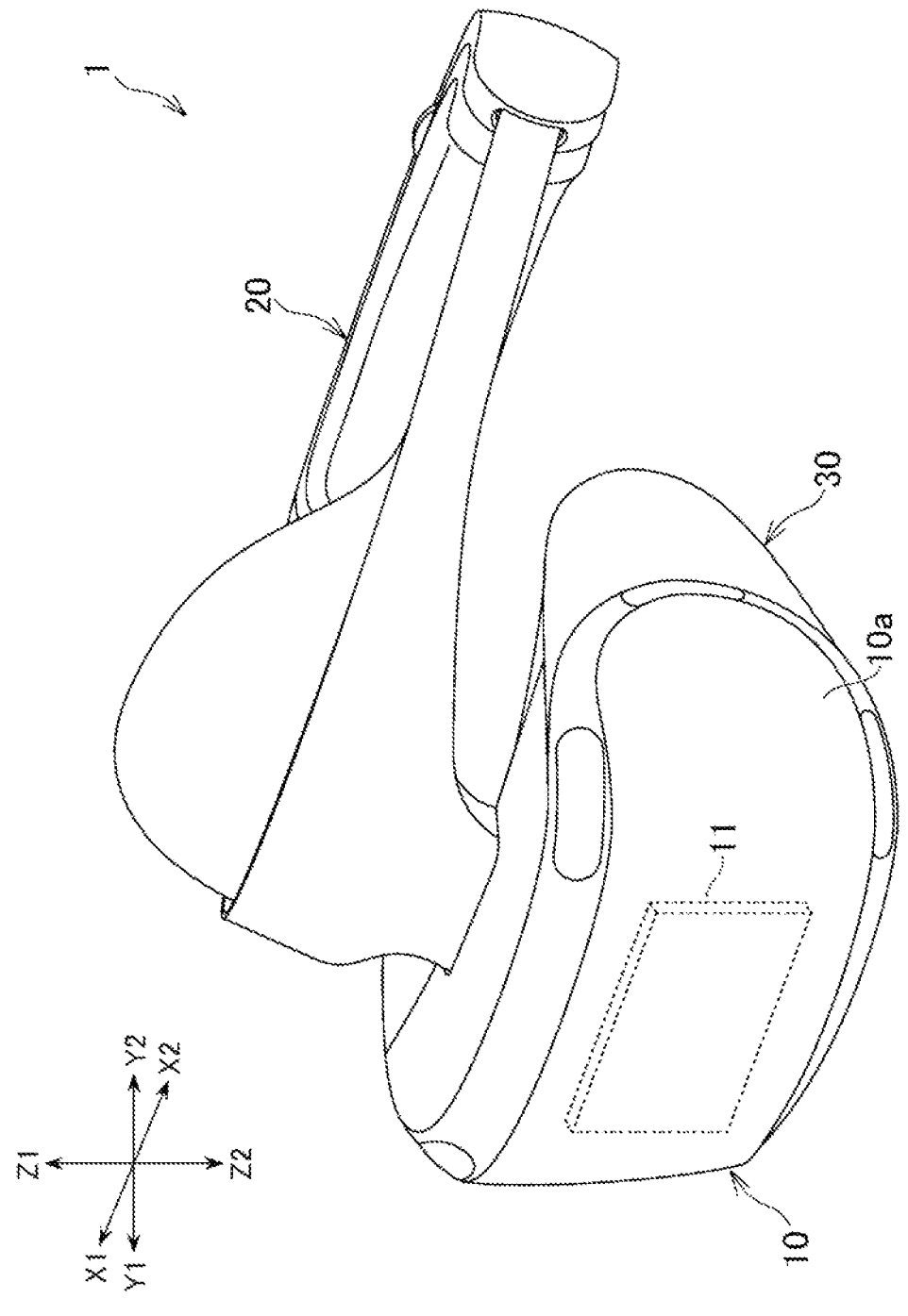
FIG. 1 is a perspective view depicting a general configuration of a head-mounted display according to the present embodiment.

FIG. 1 is a perspective view depicting a general configuration of the HMD according to the present embodiment. As depicted in FIG. 1, the HMD 1 includes a device main body 10 and a mounting band 20.

The mounting band 20 extends backwardly from the device main body 10. When the HMD 1 is to be used, the mounting band 20 surrounds the head of the user. It is preferable that the mounting band 20 have an annular shape such that the head of the user is placed in the inside of the same.

The device main body 10 includes at least a display 11, a right lens 12R and a left lens 12L (refer to FIG. 6), and a housing 10a that accommodates the display 11, the right lens 12R, and the left lens 12L therein and that configures the exterior of the device main body 10. In an example of the HMD 1, the display 11 displays a three-dimensional image. However, this is not restrictive, and the image to be displayed on the display 11 may be a two-dimensional image. Although it is preferable that the display 11 be, for example, a liquid crystal display device or an organic electroluminescence display device, the type of the display 11 is not specifically limited to any type. When the HMD 1 is used, the device main body 10 covers the front of the eyes of the user. It is preferable that the housing 10a be, for example, made of resin.

It is to be noted that, although an example in which the housing 10a has a display built therein is described in the description of the present embodiment, this is not restrictive. For example, the housing 10a may have a configuration in which a portable terminal is accommodated in the device main body 10 such that image light from the display of the accommodated portable terminal is introduced to the eyes of the user. In this case, it is preferable that, for example, a smartphone be used as the portable terminal.

The mounting band 20 may be configured in such a manner as to support the device main body 10 for relative movement in the forward and backward directions with respect to the device main body 10. Such a configuration as just described makes it possible to adjust the distance between the eyes of the user and the right lens 12R and the left lens 12L. Further, together with this, it is possible to adjust the distance from a light-shielding member 30 described later to the face of the user to thereby adjust the contact pressure to the face of the user. In addition, the mounting band 20 may be structured such that the length thereof can be adjusted according to the size of the head of the user. It is to be noted that it is sufficient only if the mounting band 20 is mounted on the head of the user and supports the device main body 10, and the configuration of the mounting band 20 depicted in FIG. 1 is not restrictive.

[Light-Shielding Member]

Figure 2:
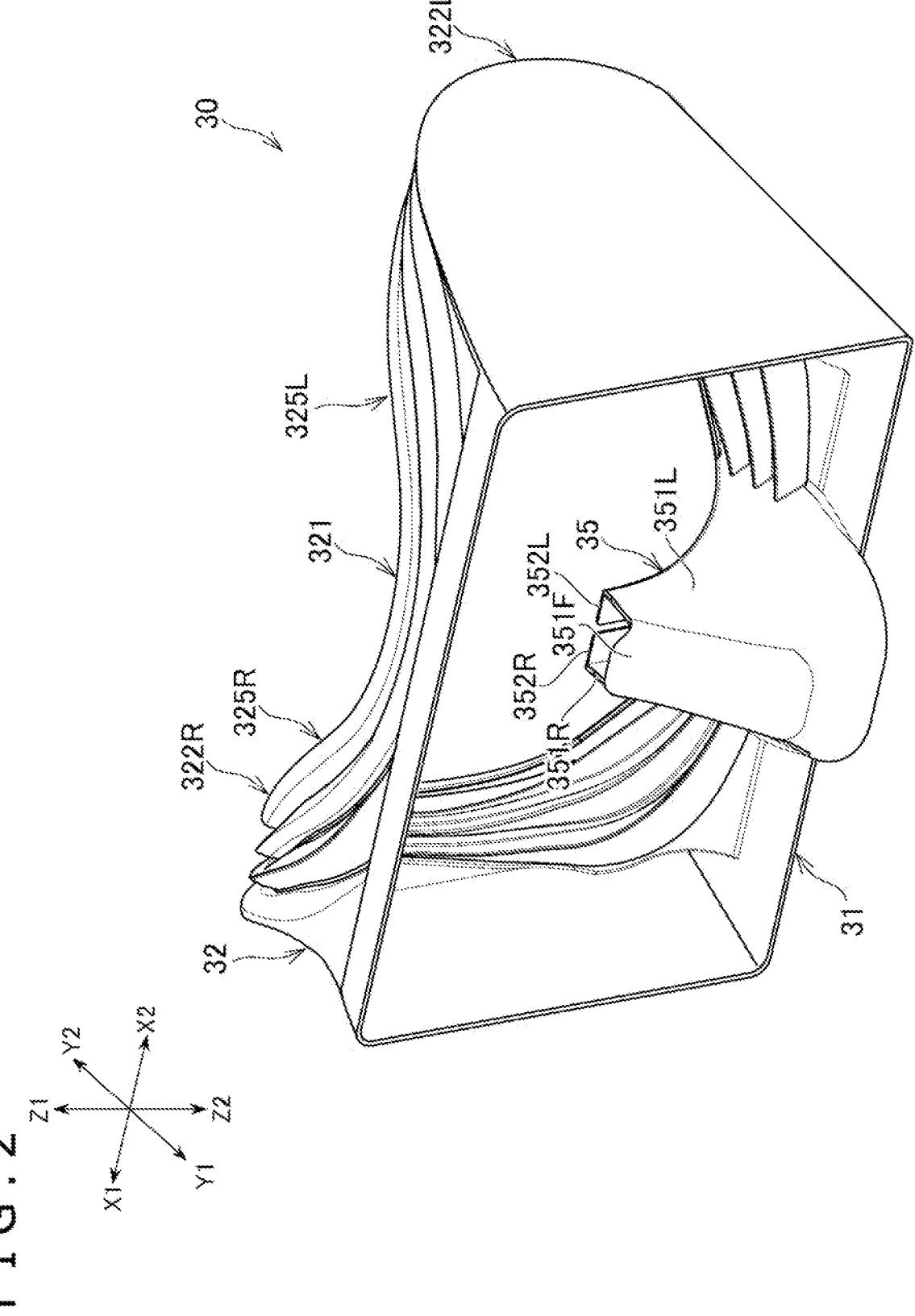
FIG. 2 is a perspective view of a light-shielding member of the present embodiment as viewed from the front diagonally.
Figure 6:
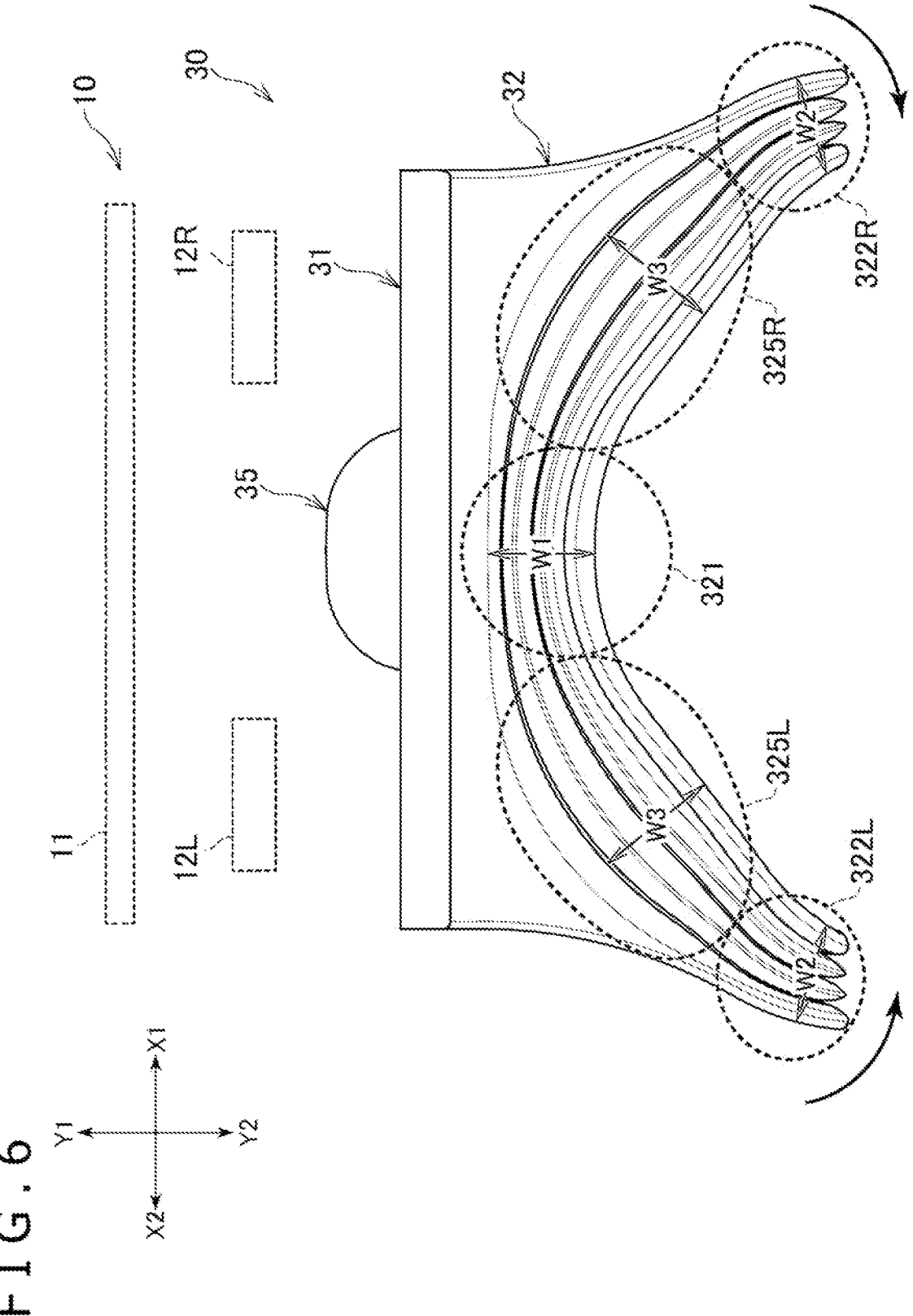
FIG. 6 is a top plan view of the light-shielding member of the present embodiment as viewed from above.
Figure 7:
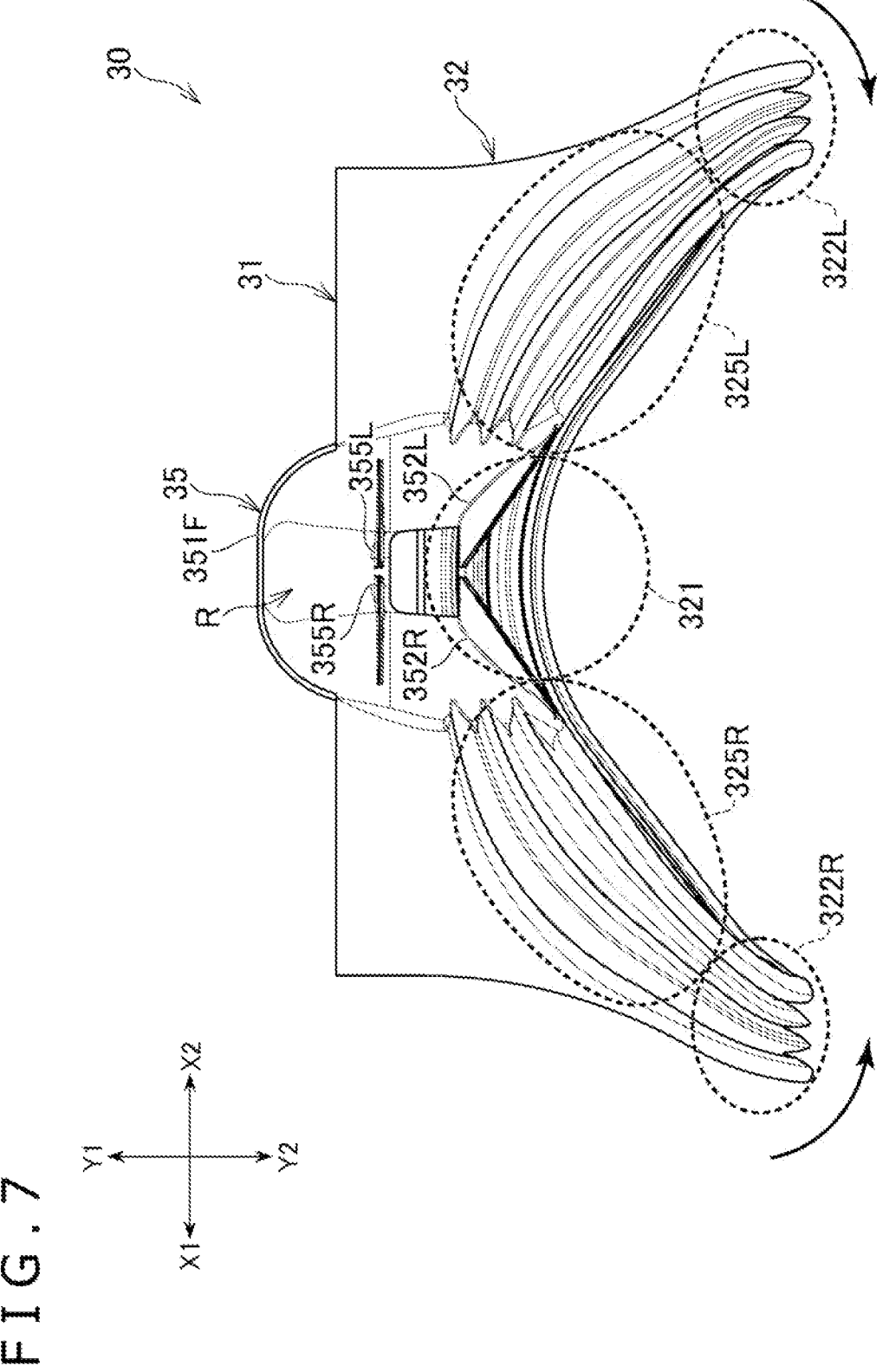
FIG. 7 is a bottom plan view of the light-shielding member of the present embodiment as viewed from below.

Now, details of the light-shielding member 30 of the present embodiment are described with reference to FIGS. 2 to 8. FIG. 2 is a perspective view of the light-shielding member of the present embodiment as viewed from the front diagonally. FIG. 3 is a front elevational view of the light-shielding member of the present embodiment as viewed from the front. FIG. 4 is a perspective view of the light-shielding member of the present embodiment as viewed from the back diagonally. FIG. 5 is a rear elevational view of the light-shielding member of the present embodiment as viewed from the back. FIG. 6 is a top plan view of the light-shielding member of the present embodiment as viewed from above. In FIG. 6, part of the internal structure of the device main body 10 is depicted schematically. FIG. 7 is a bottom plan view of the light-shielding member of the present embodiment as viewed from below. FIG. 8 is a perspective view of the light-shielding member of the present embodiment as viewed from below diagonally.

The light-shielding member 30 is a member that is provided in order to intercept or reduce external light to be incident to the eyes of the user who is wearing the HMD 1. It is preferable that the light-shielding member 30 be made of resin having elasticity. However, the light-shielding member 30 is not limited to a member made of resin and may be made of, for example, a fibrous material (sponge or the like).

The light-shielding member 30 includes an attachment portion 31 that is attached to the housing 10a of the device main body 10. It is preferable that the attachment portion 31 have an annular shape that encloses, as viewed from the back, the right lens 12R and the left lens 12L accommodated in the housing 10a. Further, it is preferable that the attachment portion 31 be configured to be detachably attached to the housing 10a. For example, it is preferable that a plurality of locking projections be formed at a front portion of the attachment portion 31 such that they are fitted in a plurality of grooves formed on the housing 10a, to allow the light-shielding member 30 to be attached to the housing 10a. However, this is not restrictive, and the attachment portion 31 may be formed fixedly on the housing 10a by two-color molding or insert molding.

Further, the light-shielding member 30 includes a light-shielding wall 32 extending backwardly from the attachment portion 31. The light-shielding wall 32 extends backwardly from the attachment portion 31 in such a manner as to come into contact with the periphery of the eyes of the user who is wearing the HMD 1. Since the light-shielding member 30 includes the light-shielding wall 32, the light-shielding member 30 demonstrates a function of intercepting or reducing external light to be incident to the eyes of the user who is wearing the HMD 1. It is to be noted that it is preferable that the attachment portion 31 and the light-shielding wall 32 be integrated with each other.

The light-shielding wall 32 includes an upper portion 321, a right portion 322R, and a left portion 322L. The upper portion 321 is a portion that comes into contact with the upper side of the eyes of the user who is wearing the HMD 1. The right portion 322R is a portion that comes into contact with the right side of the right eye of the user who is wearing the HMD 1. The left portion 322L is a portion that comes into contact with the left side of the left eye of the user who is wearing the HMD 1.

Moreover, the light-shielding wall 32 includes a right connection portion 325R that connects the upper portion 321 and the right portion 322R to each other and a left connection 325L that connects the upper portion 321 and the left portion 322L to each other.

With reference to FIGS. 6 and 7, portions corresponding to the upper portion 321, the right portion 322R, the left portion 322L, the right connection portion 325R, and the left connection portion 325L are each indicated by a broken line circle. It is to be noted that the light-shielding wall 32 is composed of a single member and the boundaries of the portions mentioned are not defined in a precise manner.

Further, the light-shielding wall 32 has bellows that come into contact with the periphery of the eyes of the user who is wearing the HMD 1 and deform to expand and contract in response to the contact pressure. In the description of the present embodiment, an example in which the bellows are provided over the overall periphery of the light-shielding wall 32 is described. In particular, depicted is an example in which the bellows are provided on each of the upper portion 321, the right portion 322R, the left portion 322L, the right connection portion 325R, and the left connection portion 325L.

Here, the bellows include mountain portions and valley portions formed alternately. In the present embodiment, bellows having four mountain portions M1 to M4 and three valley portions G1 to G3 formed alternately thereon are depicted. It is to be noted that, in order to avoid complicated illustration in the figures, the reference characters of the mountain portions and the valley portions are depicted only in FIG. 5. Note that the numbers of the mountain portions and the valley portions are not limited to the above-mentioned numbers and may be greater or smaller than those of the example depicted. If the numbers of the mountain portions and the valley portions are increased, then the expansion and contraction performance of the light-shielding wall 32 can be improved. On the other hand, if the numbers of the mountain portions and the valley portions are decreased, then the configuration of the light-shielding wall 32 can be simplified.

Further, in the present embodiment, cutouts CR and CL are provided at the innermost mountain portion M1 of the bellows at the right portion 322R and the left portion 322L as depicted in FIG. 5 and so forth. The cutouts CR and CL are provided in front of the ears of the user who is wearing the HMD 1 and have a predetermined width in the upward and downward directions. Since the cutouts CR and CL are provided in this manner, even in a case where the user wears the HMD 1 in a state in which the user is wearing eyeglasses, deformation of the light-shielding wall 32, due to the interference of temples of the eyeglasses with the right portion 322R and the left portion 322L of the light-shielding wall 32, to such a degree that a gap is formed between the light-shielding wall 32 and the face of the user can be suppressed. In addition, since the temples of the eyeglasses are avoided from interfering with the right portion 322R and the left portion 322L of the light-shielding wall 32, also in a state in which the user is wearing eyeglasses, the user can wear the HMD 1 without having an uncomfortable feeling.

It is to be noted that it is preferable that the cutouts CR and CL be provided at least at portions of the right portion 322R and the left portion 322L that include the innermost mountain portion or valley portion. For example, the cutouts CR and CL may be provided across the innermost mountain portion M1 and the valley portion G1 adjacent to the mountain portion M1. Further, for example, in a case where a valley portion of the bellows at the right portion 322R and the left portion 322L is provided on the innermost side, it is preferable that the cutouts CR and CL be provided at the innermost valley portion.

Here, in the present embodiment, as depicted in FIG. 6, a width W3 of the bellows at the right connection portion 325R and the left connection portion 325L as viewed from above is made greater than a width W1 of the bellows at the upper portion 321 and a width W2 of the bellows at the right portion 322R and the left portion 322L. Owing to such a configuration as just described, when the user tries to wear the HMD 1, the head of the user is first brought into contact with the right connection portion 325R and the left connection portion 325L. Consequently, the right connection portion 325R and the left connection portion 325L are compression-deformed.

As the right connection portion 325R and the left connection portion 325L are compression-deformed, the right portion 322R moves leftwardly while the left portion 322L moves rightwardly. In other words, the right portion 322R and the left portion 322L move in the directions indicated by arrows marks in FIGS. 6 and 7. Consequently, the head of the user is sandwiched by the right portion 322R and the left portion 322L. In particular, the right portion 322R comes into contact with the right side of the right eye of the user with a predetermined contact pressure while the left portion 322L comes into contact with the left side of the left eye of the user with a predetermined contact pressure. It is to be noted that, in the present embodiment, the right portion 322R moves leftwardly by bending of the light-shielding wall 32 at the boundary (inflection point) between the right portion 322R and the right connection portion 325R. Similarly, the left portion 322L moves rightwardly by bending of the light-shielding wall 32 at the boundary (inflection point) between the left portion 322L and the left connection portion 325L.

As described above, the right connection portion 325R connects the upper portion 321 and the right portion 322R to each other such that, as the contact pressure to the right connection portion 325R increases, the right portion 322R comes closer to the face of the user. Similarly, the left connection portion 325L connects the upper portion 321 and the left portion 322L to each other such that, as the contact pressure to the left connection portion 325L increases, the left portion 322L comes closer to the face of the user.

Further, in the present embodiment, as viewed from above, the right portion 322R and the right connection portion 325R extend diagonally to the right and backward. Moreover, as viewed from above, the left portion 322L and the left connection portion 325L extend diagonally to the left and backward. In particular, the light-shielding wall 32 has a substantially V shape as viewed from above. Since the light-shielding wall 32 is shaped in such a manner as just described, the face of the user of the HMD 1 easily comes into contact with the light-shielding wall 32 in comparison with that in an alternative configuration in which the right portion 322R, the right connection portion 325R, the left portion 322L, and the left connection portion 325L extend straightly backwardly. Therefore, generation of a gap between the face of the user and the light-shielding wall 32 can be suppressed.

Since such a configuration as described above is adopted, even in a case where a user with a small head wears the HMD 1, the right portion 322R and the left portion 322L move in such a manner as to come closer to the face of the user, and therefore, entrance of external light through a gap between the right portion 322R and the left portion 322L and the face of the user is suppressed. As a result, incidence of external light to the eyes of the user is suppressed.

Further, in a case where a user with a large head wears the HMD 1, since the light-shielding wall 32 includes the bellows that deform to expand and contract in response to the contact pressure, the contact pressure acting upon the face of the user is moderated. As a result, an uncomfortable feeling arising from the contact of the light-shielding wall 32 can be suppressed.

In addition, the light-shielding member 30 includes, at a lower portion thereof, a nose accommodation portion 35 into which the nose of the user who is wearing the HMD 1 is to be accommodated. It is preferable that the nose accommodation portion 35 be formed in such a manner as to project forwardly such that, in a state in which the light-shielding member 30 is attached to the housing 10a, it is fitted in a recessed portion (not depicted) formed at a lower portion of the housing 10a. Since the light-shielding member 30 includes the nose accommodation portion 35 in this manner, an uncomfortable feeling arising from interference of the nose of the user who is wearing the HMD 1 with the light-shielding wall 32 can be suppressed.

The nose accommodation portion 35 includes a front portion 351F, a right portion 351R, and a left portion 351L and is open downwardly and backwardly. The nose of the user who is wearing the HMD 1 is placed in a space R enclosed by the front portion 351F, the right portion 351R, and the left portion 351L.

In addition, the nose accommodation portion 35 includes a first right light-shielding portion 352R provided at a rear end of the right portion 351R in such a manner as to cover the back of the space R and a first left light-shielding portion 352L provided at the left portion 351L in such a manner as to cover the back of the space R. It is preferable that the first right light-shielding portion 352R and the first left light-shielding portion 352L have a sheet-like shape. In the present embodiment, the first right light-shielding portion 352R and the first left light-shielding portion 352L are spaced away from each other in the leftward and rightward directions as depicted in FIG. 4 and so forth, and a slit that extends in the upward and downward directions is formed between them.

The nose of the user who is wearing the HMD 1 is accommodated into the space R through the slit formed between the first right light-shielding portion 352R and the first left light-shielding portion 352L. Since the nose accommodation portion 35 includes the first right light-shielding portion 352R and the first left light-shielding portion 352L in this manner, entrance of external light through a gap between the right portion 351R and the left portion 351L of the nose accommodation portion 35 and the nose of the user can be suppressed. As a result, incidence of external light to the eyes of the user can be suppressed.

In addition, the nose accommodation portion 35 includes a second right light-shielding portion 355R arranged in front of the first right light-shielding portion 352R and a second left light-shielding portion 355L arranged in front of the first left light-shielding portion 352L. It is preferable that the second right light-shielding portion 355R and the second left light-shielding portion 355L have a sheet-like shape. The second right light-shielding portion 355R and the second left light-shielding portion 355L are arranged in such a manner as to divide the space R into two spaces in the forward and backward directions. Further, the second right light-shielding portion 355R and the second left light-shielding portion 355L are spaced away from each other in the leftward and rightward directions, and a slit that extends in the upward and downward directions is formed between them.

In a case where a user with a large nose (with a nose whose length in the forward and backward directions is great) wears the HMD 1, the nose of the user is accommodated into the space R through the slit formed between the first right light-shielding portion 352R and the first left light-shielding portion 352L and the slit formed between the second right light-shielding portion 355R and the second left light-shielding portion 355L. By such a configuration as just described, entrance of external light through a gap between the right portion 351R and the left portion 351L of the nose accommodation portion 35 and the nose of the user can be suppressed.

In the HMD 1 according to the present embodiment described above, in a case where it is used by a user with a small head, incidence of external light to the eyes of the user can be suppressed, and as a result, an immersive feeling can be improved. On the other hand, in a case where the HMD 1 is used by a user with a large head, an uncomfortable feeling for the user due to the contact pressure of the light-shielding member 30 can be suppressed.

It is to be noted that the light-shielding member 30 presented in the present embodiment is an example, and it is sufficient if the light-shielding wall 32 therein includes at least at part thereof bellows that are deformed to expand and contract in response to the contact pressure.

The invention claimed is:

1. A light-shielding member that reduces external light to be incident to eyes of a user who is wearing a head-mounted display, comprising:

an attachment portion that is attached to a housing of the head-mounted display; and a light-shielding wall extending backwardly from the attachment portion, wherein the light-shielding wall includes at least at part thereof bellows that come into contact with a periphery of the eyes of the user who is wearing the head-mounted display and are deformed to expand and contract in response to a contact pressure, the bellows include a plurality of bellows portions, wherein each respective bellows portion of the plurality of bellows portions includes bellows, and at least one cutout located on an innermost mountain ridge portion or a valley ridge portion of the bellows and forms an indentation in the bellows.

2. The light-shielding member according to claim 1, wherein the light-shielding wall includes an upper portion that comes into contact with an upper side of the eyes of the user who is wearing the head-mounted display, and the bellows are provided at least at the upper portion.

3. The light-shielding member according to claim 1, wherein the light-shielding wall includes a right portion that comes into contact with a right side of a right eye of the user who is wearing the head-mounted display and a left portion that comes into contact with a left side of a left eye of the user who is wearing the head-mounted display, and the bellows are provided at least at the right portion and the left portion.

4. The light-shielding member according to claim 3, wherein the bellows have mountain portions and valley portions formed alternately thereon.

5. The light-shielding member according to claim 1, wherein the light-shielding wall includes an upper portion that comes into contact with an upper side of the eyes of the user who is wearing the head-mounted display, a right portion that comes into contact with a right side of a right eye of the user who is wearing the head-mounted display, a left portion that comes into contact with a left side of a left eye of the user who is wearing the head-mounted display, a right connection portion that connects the upper portion and the right portion to each other, and a left connection portion that connects the upper portion and the left portion to each other, the right connection portion connects the upper portion and the right portion to each other such that the right portion moves leftwardly as the contact pressure to the right connection portion increases, and the left connection portion connects the upper portion and the left portion to each other such that the left portion moves rightwardly as the contact pressure to the left connection portion increases.

6. The light-shielding member according to claim 5, wherein the bellows are provided over the right portion, the right connection portion, the upper portion, the left connection portion, and the left portion, and, as viewed from above, a width of the bellows at the right connection portion and the left connection portion is greater than a width of the bellows at least at the upper portion.

7. The light-shielding member according to claim 5, wherein:

as viewed from above, the right portion and the right connection portion extend diagonally to right and backward, and, as viewed from above, the left portion and the left connection portion extend diagonally to left and backward.

8. The light-shielding member according to claim 1, wherein:

the light-shielding member includes, at a lower portion thereof, a nose accommodation portion into which a nose of the user who is wearing the head-mounted display is accommodated, and the nose accommodation portion includes an opening that opens backwardly and includes at least a first light-shielding portion that reduces external light to be incident to the eyes of the user through the opening.

9. The light-shielding member according to claim 8, wherein the nose accommodation portion is arranged in front of the first light-shielding portion and further includes a second light-shielding portion that reduces external light to be incident to the eyes of the user through the opening.

10. The light-shielding member according to claim 1, wherein the attachment portion is detachably attached to the housing.

11. A head-mounted display comprising:

a housing;

a mounting band that extends backwardly from the housing and is to be mounted on a head of a user; and a light-shielding member that reduces external light to be incident to eyes of the user, wherein the light-shielding member includes an attachment portion that is attached to the housing, and a light-shielding wall extending backwardly from the attachment portion, and wherein the light-shielding wall includes at least at part thereof bellows that come into contact with a periphery of the eyes of the user who is wearing the head-mounted display and are deformed to expand and contract in response to a contact pressure, the bellows includes right and left bellow portions which include at least one cutout provided in an innermost mountain ridge portion or a valley ridge portion of the right and left bellows portions, the cutout forming an indentation in the bellows.

12. A light-shielding member that reduces external light to be incident to eyes of a user who is wearing a head-mounted display, comprising:

an attachment portion that is attached to a housing of the head-mounted display; and a light-shielding wall extending backwardly from the attachment portion, wherein the light-shielding wall includes at least at part thereof bellows that come into contact with a periphery of the eyes of the user who is wearing the head-mounted display and are deformed to expand and contract in response to a contact pressure, the bellows including a cutout;

a nose accommodation portion at a lower portion of the light-shielding member and into which a nose of the user who is wearing the head-mounted display is accommodated, wherein the nose accommodation portion includes an opening which opens backwardly and includes at least a first light-shielding portion that reduces external light to be incident to the eyes of the user through the opening, and wherein the nose accommodation portion is arranged in front of the first light-shielding portion and further includes a second light-shielding portion that reduces external light to be incident to the eyes of the user through the opening.

13. The light-shielding member of claim 12, wherein the first light-shielding portion is spaced from the second light-shielding portion by a slit.

14. The light-shielding member of claim 13, wherein the first light-shielding portion and the second light-shielding portion are configured to receive a nose of the user.

15. The light-shielding member of claim 12, wherein the nose accommodation portion includes a first end that extends a length from the light-shielding wall and a second end that is coupled to the bellows.

16. The light-shielding member of claim 12, further comprising: a right light-shielding portion positioned in front of the first light-shielding portion and a left light-shielding portion positioned in front of the second light-shielding portion, wherein the right light-shielding portion is spaced from the left light-shielding-portion.

\* \* \* \* \*